(12) United States Patent
Ohrmann

(10) Patent No.: US 12,042,892 B1
(45) Date of Patent: Jul. 23, 2024

(54) METHOD AND ASSEMBLY UNIT FOR MOUNTING AN ELASTIC RING AND RING MOUNTING DEVICE

(71) Applicant: Ohrmann GmbH, Moehnesee (DE)

(72) Inventor: Coelestin Ohrmann, Moehnesee (DE)

(73) Assignee: Ohrmann GmbH, Moehnesee (DE)

( * ) Notice: Subject to any disclaimer, the term of this patent is extended or adjusted under 35 U.S.C. 154(b) by 0 days.

(21) Appl. No.: 18/197,212

(22) Filed: May 15, 2023

(51) Int. Cl.
*B23P 19/08* (2006.01)

(52) U.S. Cl.
CPC .................. *B23P 19/084* (2013.01)

(58) Field of Classification Search
CPC ......... B23B 31/16254; B23B 31/16241; B23P 19/084; Y10T 29/53657; Y10T 29/5383; B25B 27/0028
See application file for complete search history.

(56) References Cited

U.S. PATENT DOCUMENTS

| | | | |
|---|---|---|---|
| 2,422,065 A | 6/1947 | Anselmi | |
| 4,782,573 A | 11/1988 | Le Floch | |
| 7,891,067 B2 * | 2/2011 | Muhlenbruck | A01K 85/00 29/272 |
| 8,671,533 B2 * | 3/2014 | Haag | B23B 31/16254 269/20 |
| 2007/0271753 A1 | 11/2007 | Haag et al. | |
| 2009/0106966 A1 * | 4/2009 | Muhlenbruck | A01K 85/00 29/428 |

FOREIGN PATENT DOCUMENTS

| | | |
|---|---|---|
| DE | 102005007932 A1 | 8/2006 |
| WO | 2018224535 A1 | 12/2018 |

* cited by examiner

*Primary Examiner* — Lee A Holly
(74) *Attorney, Agent, or Firm* — McNees Wallace & Nurick LLC

(57) ABSTRACT

A method of mounting an elastic ring, e.g. sealing ring, on a body via a mounting unit is presented, having at least three fingers which are movable relative to each other. The method comprises holding and clamping the ring on the exterior side of the fingers which extend into a cross-section framed by the ring, moving at least one finger along a circle or a plurality of fingers along a common circle or a plurality of concentric circles such that the elastic ring is stretched and the cross-section thereof is increased, moving the ring and the component relative to each other so that the component projects into the cross-section and the ring extends around the component, moving one or more fingers relative to each other so that the ring contacts the component in sections between adjacent fingers, and moving the fingers out of the ring. Also disclosed are a mounting unit for executing the method, and a ring mounting device including such a mounting unit.

7 Claims, 14 Drawing Sheets

METHOD AND ASSEMBLY UNIT FOR MOUNTING AN ELASTIC RING AND RING MOUNTING DEVICE

The invention relates to a method and to a mounting unit for mounting one or more elastic rings, and to a ring mounting device.

For mounting an elastic ring, in particular a sealing ring on the exterior side of a body (also referred to as component), in particular a circular cylindrical body, it is necessary to expand the elastic ring during the mounting process.

In the prior art, there are various approaches and ideas for mounting an elastic ring on a body. These approaches and ideas have only partially found their way into practice.

The term "elastic ring" covers not only more or less rigid O-rings, but also annular shaped seals in general, e.g. Simmer shaft seals, contour sealing rings or lip sealing rings.

Three processes which differ in their basic approach have substantially become widely accepted in series production. A first approach is the use of joining sleeves, a second approach is the use of multi-finger systems, and a third is the so-called needle technique.

A joining sleeve is an intermediate component which is used as a mounting aid and on the basis of which the elastic ring is mounted on the final component. A distinction is made here between conical and cylindrical joining sleeves.

In the case of a conical joining sleeve, the elastic ring is first threaded onto the thinned rear-side end of the joining sleeve. A further advancement to the front, thicker end of the joining sleeve then stretches the elastic ring. This can lead to an rolling movement and thus to twisting of the elastic ring. This then often results in faulty functioning of the elastic ring, as the ring is not applied torsion-free to the body after twisting. The elastic ring is then pushed from the joining sleeve onto the final component in the mounting position. The component is typically inserted into a front-side opening of the joining sleeve.

If a cylindrical joining sleeve is used, the ring is placed directly onto the front end of the joining sleeve, the ring being thus stretched. Different methods are possible.

Both mounting methods with joining sleeves require considerable mechanical and control engineering effort. In addition, the conical joining sleeve also permits to realize only a limited insertion depth and thus a mounting of the ring only relatively close to the front side of the component. As the ring is received at one end of the conical joining sleeve and released at the other end, a conical joining sleeve cannot be firmly connected to the mounting unit and must therefore be held in place by additional mechanical measures.

A further possibility for mounting elastic rings is the so-called multi-finger gripper. Here, the elastic sealing ring is usually expanded by six inner fingers as the fingers move radially outwards. The expanded elastic ring can then be applied directly to the component. The six fingers expand the ring to form a hexagon so that the component can penetrate into the expanded ring. The component is inserted to such an extent that the ring reaches the desired position on the component in the axial direction. To mount the ring in the component groove or in the desired position on the component, the fingers must now be withdrawn from the ring. However, as the ring only adheres to the fingers, an additional mechanism is required which holds the ring in the desired axial position and strips it from the fingers when the fingers are withdrawn from the extremely stretched ring. Partially high frictional forces are thus produced which promote damaging twisting of the ring. In addition, an abrupt relaxation of the ring is generated when the fingers are pulled out of the ring. This relaxation leads to an uncontrollable (trajectory) change in the location of the ring and thus to a final position of the ring on the component which cannot be predetermined. For this reason, in some multi-finger systems, the fingers are retracted individually or in groups against the wiper, so that the ring stretching and thus the ring tension are not abruptly reduced so much at once. The high frictional forces and the abrupt relaxation of the ring can lead to quality problems with regard to ring stretching or torsion and even damage to the ring. The multi-finger technology requires very complex mechanics and control technology with correspondingly extensive tubing and cable routing, which usually then make these multi-finger grippers relatively heavy and bulky. Therefore, the integration onto a robot arm also turns out to be very unfavorable.

In addition, the insertion depth that can be achieved with direct mounting using a multi-finger gripper is even more limited than with mounting using a joining sleeve. For this reason, this technique is often only used to expand the ring, to then transfer the latter onto a cylindrical joining sleeve. However, this combination of a joining sleeve and a multi-finger gripper is not an economical solution.

In addition, it is possible to use the mounting technique by means of needles which is established on the market. Here, the sealing ring is expanded and mounted by a pair of expandable needles. The work piece or a joining sleeve is moved with the free end thereof into the cross-section framed by the expanded sealing ring. During this movement, the needles move along the outer envelope of the component, i.e. the work piece or the joining sleeve. For this purpose, the needles are alternatively moved at the free end thereof in guide tracks or on guide surfaces in order to selectively spread the sealing ring more or less.

Document WO 2018/224535 A1 shows an stretching device for an elastic sealing ring, which is configured to stretch the sealing ring to form a rectangular ring body having a predetermined length-to-width ratio.

Document U.S. Pat. No. 4,782,573 A1 shows a device for inserting a sealing ring into a groove.

The object of the invention is to provide a novel method and a mounting unit by means of which one or more elastic sealing rings can be applied into one or more (ring-shaped) grooves or onto a (preferably) cylindrical body. The mounting should be possible directly by the mounting unit even at positions far away from the end of the work piece without additional intermediate steps such as the mandatory transfer to a joining sleeve. This is intended to reduce the mechanical and control effort to facilitate the possible attachment to a robot arm. In addition, the risk of damage to the elastic ring is to be reduced and its stress during expansion is also to be kept as low as possible, i.e., below the values normally to be expected with the known processes.

The object set for mounting at least one elastic ring, in particular a sealing ring on the exterior side of a body by means of a mounting unit having at least three fingers, one or more of which are movable relative to others, is achieved by a method comprising the following steps:

a) positioning fingers and the ring relative to each other such that the fingers extend through a cross-section framed by the ring, b) moving at least one finger along a circle or moving a plurality of fingers along a circle or a plurality of concentric circles such that the elastic ring is stretched and the cross-section thereof is increased, c) moving the ring and the component relative to each other so that the component projects into the cross-section and the ring extends around the component, d) moving at least one finger on the circle or a plurality of fingers on the common circle or concentric circles relative to each other so that the cross-section of the ring is reduced and the ring contacts the component in sections between adjacent fingers, and e) moving the fingers out of the cross-section, the ring sliding off the fingers and resting completely on the component.

The cross-section of the elastic ring is defined by the area enclosed and thus framed by the inner surface of the cord forming the ring.

Such a method has the advantage that the enlargement of the cross-section carried out in step b) does not involve any twisting or rolling of the elastic ring, which permits a torsion-free mounting. In addition, the movement of the finger(s) in step d) and the accompanying reduction in the cross-section of the ring allows a contacting of the component and the ring. Since this step also reduces the cord length of the stretched ring, the remaining restoring force is also significantly reduced, which then has a particularly positive effect in step e). Already in step d), the ring takes hold on the component and will thus already slip into the intended groove at the contact points, for example. This ensures that during the movement of the fingers out of the cross-section of the elastic ring carried out in step e), the elastic ring is positioned or mounted at the desired location with positional stability.

All fingers can be moved on a common circle or fingers can be moved on a different circle than other fingers, these circles being however concentric to each other.

If there are exactly three fingers, one can be movable and the others remain stationary, or two fingers can be moved relative to a stationary finger, these two fingers being adapted to be moved together and simultaneously or with a time delay. In the maximum expanded position of the ring, the fingers are preferably maximally spaced apart from each other.

By means of the method according to the invention and the mounting unit according to the invention, which will be explained later, it is also possible to mount a plurality of elastic rings simultaneously.

According to a variant of the invention, the ring is held after step a) and before step b) by the fingers which extend into the cross-section framed by the ring. Due to the inherent tension of the ring, which assumes a shape deviating from a circular shape due to the fingers, it sits so to speak on the fingers in a clamped and positionally fixed manner.

Advantageously, the fingers can be moved relative to each other so as to be moved in step b) from a basic position, in which the fingers are arranged close to each other in one or more groups, to a clamping position, in which the fingers are more evenly or even actually evenly spaced apart. Thus, starting from, for example, two groups of fingers, the elastic ring can be kept in a loop-like or oval shape in the basic position and can be stretched in step b) by the relative movements of the fingers, as a result of which it also assumes a larger cross-section. Thus, in step c), there is sufficient space to be able to arrange the component within the ring cross-section.

As mentioned, all the fingers can however also be grouped together in a singular group in the basic position. The fingers are positioned in close proximity to each other or even touch each other. Preferably, the fingers lie within an angular range of less than 90° (in particular less than 45°) from the center of the circle(s).

A particularly advantageous variant is characterized in that the mounting unit has at least four fingers, two or more of which are movable relative to others, and in that in step b), at least two fingers are moved along a common circle or a plurality of concentric circles, and in step d) fingers on the circle(s) are moved relative to each other.

The term "at least four fingers, two or more of which are movable relative to others" means that not all fingers necessarily have to be movable in space or all individually movable relative to all others, both of which are included in the definition. In addition, the definition also includes variants in which a plurality of fingers are movable in space individually, or together in groups, relative to other fingers, so that there can also be one or more fingers stationary in space or fingers that are fixedly spaced relative to each other, fingers which are movable relative to other fingers being however always provided.

Further, with a uniform distribution of the fingers in the clamping position, the ring assumes a shape similar to that of a regular polygon and is particularly suitable for mounting on circular cylindrical components while still permitting mounting on components having a shape different therefrom.

Advantageously, the fingers can be moved relative to each other individually or in groups, especially in pairs, about an axis of rotation passing through the center of the circle(s). The movement of the fingers in groups or even in pairs can result in a symmetrical expansion of the elastic ring, which distributes the resulting stresses in the ring as evenly as possible over the circumference thereof. Therefore, the stress is kept as low as possible and the risk of damage to the elastic ring can be avoided.

Preferably, the fingers are arranged individually or in groups, in particular in pairs, on finger carriers. The relative movement of the fingers in step b) is caused by a rotation of at least one finger carrier about the axis of rotation with respect to another. Thus, to expand the elastic ring, only the drive of one finger carrier relative to the other(s) is necessary to cause a movement of one or more fingers along a circular path, which results in a uniform expansion of the elastic ring.

The mounting unit may have at least two, but preferably at least three finger carriers, wherein at least one (preferably even exactly one) finger carrier is fixed against rotation and the further finger carrier(s) (41, 42, 42', 42", 42''') permit a rotational movement about the axis of rotation (A), so that the fingers (30 to 35) in step b) are at least approximately evenly distributed at the circumference. Alternatively, all finger carriers can be rotated. This variant allows any polygonal shape to be imposed on the ring in the clamping position in addition to a uniform polygonal shape.

The object mentioned in the introductory part is further achieved by a mounting unit for executing the method according to the invention, having at least three fingers, at least one of which is movable relative to at least one other along a common circle or a plurality of concentric circles, wherein the fingers are movable from a basic position, in which they are circumferentially unevenly distributed on the circle(s) and can project into a cross-section framed by an elastic ring, to a clamping position in which they are more evenly distributed on the circle(s) and increase the cross-section framed by the ring, and wherein the finger(s) are movable back to the basic position. The advantages resulting therefrom can be taken from the above paragraphs.

In particular, the mounting unit has at least four fingers, two or more of which are movable relative to others, and at least two fingers are movable along a common circle or a plurality of concentric circles.

Preferably, at least six fingers are provided, which are arranged in pairs on finger carriers and are movable relative to each other about a common axis of rotation. The common axis of rotation allows relative movement of all fingers on circular arcs which all define the same circle, or on concentric circular arcs.

The finger carriers can be disk-shaped or ring-shaped. The free space within the finger carrier, i.e. the central opening in ring-shaped finger carriers, allows the component to be inserted far into the mounting unit. This also allows the elastic ring to be mounted at locations far from an axial end of the component.

The finger carriers can be arranged one above the other in the direction of the common axis of rotation. This enables a particularly compact and space-saving design of the mounting unit.

A variant of the invention provides that all fingers extend axially away from an end-side finger carrier towards their free end and that fingers of all other finger carriers extend axially past all finger carriers in the direction of the end-side finger carrier and past the end-side finger carrier. That is, the end-side finger carrier is the one adjacent to the ring(s). However, the fingers all project on one side relative thereto. The ring(s) are received in this projecting receiving area. The fingers which are not attached to the end-side finger carrier project into this receiving area from other planes, so to speak. They may extend through the central opening if finger carriers are ring-shaped, or may extend radially outward past the finger carriers. In both cases, these fingers extend past the other finger carriers on the inner or exterior side.

The fingers can be seated in pairs on a common finger carrier and can be arranged offset by 180° to the axis of rotation on their finger carrier. This allows symmetrical clamping of the elastic ring.

Preferably, finger carriers have mechanical end stops acting in the circumferential direction. At least one or the driven finger carriers (optionally also moving finger carriers which do not have their own driven drive) have a driver. The end stops and drivers limit the relative rotation of the finger carriers to each other, wherein at least in the clamping position, optionally also in the basic position, all fingers rest on the associated end stops. The singular driver for all moving finger carriers, which is provided on a moving finger carrier, or the multiple drivers provided on different moving finger carriers abut against the end stop of another, in particular the adjacent finger carrier. This finger carrier can then either be moved along therewith or may be a stationary finger carrier. Thus, the rotational movement of the finger carriers is possible only up to a certain extent, and the end stops make it possible to precisely define the end position thereof. As a result, the finger carriers can be adjusted without having to detect the exact angle of rotation of the finger carriers by sensors, as the basic position and the clamping position are defined by the end stops.

As already mentioned, one of the finger carriers can be driven directly and be first moved from the basic position toward the clamping position and, on the way between the basic position and the clamping position, also move another finger carrier via a driver, preferably until the last moving finger carrier abuts against an end stop that is then no longer moved. This can generate a relative movement between the finger carriers for which a single drive is sufficient. The entrainment of the other finger carriers by the one driven finger carrier results in the accommodated elastic ring being gently stretched or tensioned so that the tensile stresses can be evened out.

In one embodiment, the fingers or, if there are finger carriers, the finger carriers are electrically driven. Sensors detect the position of the fingers in the basic position and the clamping position. The sensors can optionally permanently detect the position of the fingers and/or the finger carriers.

Optionally, it is possible to move the fingers, including the fingers of a pair of fingers, individually relative to each other. Thus, each finger can be adjusted individually and, if necessary, even mechanically independently of the other fingers. This adjustment can be achieved by various driving concepts and is not limited to an electric drive.

Preferably, the fingers can form the corners of a regular polygon in the clamping position.

The fingers may be rounded or chamfered at their outer circumference in the area of contact with the ring. Furthermore, the contour of the fingers can be adapted to the contour of the ring, e.g. the shaped seal. It is thus ensured that the elastic ring slides over the fingers during relative movement of the finger carriers, which also results in movement of the fingers, and cannot be damaged by sharp edges. In addition, the movement of the fingers out of the cross-section of the elastic ring in step e) (also because of the reduced ring tension) is also much gentler and prevents slitting of the elastic ring.

Optionally, rotatable rollers may also be attached to the fingers or form the fingers to prevent sliding movement.

Preferably, at least one finger is mounted in a stationary manner on the mounting unit and further fingers are movable along the circle. Thus, the stationary finger(s) remain in the basic position and the movable fingers allow the elastic ring to be stretched open and a clamping position to be reached.

One advantageous variant of the invention provides that all driven fingers are arranged adjacent to each other and in a common group in the basic position and are spaced apart from each other in the clamping position, preferably with the fingers of the group lying on a common or on several concentric circles in the basic position. Due to this positioning of the fingers, they are very close to each other in the basic position, so that the distance between the fingers furthest apart, together with the finger thicknesses to be added, is smaller than the cross-section of the rings to be mounted. This in turn means that the rings do not have to be deformed, i.e. brought into a different shape when they are placed on the mounting unit or picked up by the mounting unit. The rings are simply placed on the mounting unit when the fingers are sticking out upwards, and still have plenty of play at the sides with respect to the fingers. The rings are then centered precisely to the mounting unit only when the fingers are moved. Conversely, the fingers can however also simply enter the cross-section framed by the ring when they are pointing downwards, and then be moved away from each other. Again, the positional tolerances are very high, which also improves the overall reliability of the mounting unit.

Further improvement can be achieved in that even moving and stationary fingers are arranged in a group, or generally within an angular range of less than 90° relative to the center of the circle(s).

Optionally, at least one or even all fingers can be movable inwards and outwards. This is particularly important in the basic position, as it can simplify the accommodation of rings having an unfavorable diameter/chord ratio or in the case of special shapes. Furthermore, by changing the distance of the fingers from the axis of rotation, the mounting unit can also be adjusted to different ring dimensions.

Furthermore, the object mentioned in the introductory part is achieved by a ring mounting device having a multi-axis, freely programmable arm and a mounting unit mounted on the arm according to one of the previous paragraphs. This has the advantage that the mounting unit can also be used for automatic mounting of the elastic ring on components positioned at different locations in space. Here, the compact design and low weight of the presented mounting unit provide a considerable advantage compared to the multi-finger technique.

Ring mounting using the mounting unit according to the invention is suitable for a fully automatic process, but it can also be applied at manual workstations.

The invention is described below with reference to various embodiments which are illustrated in the accompanying drawings and in which.

Figure 9:
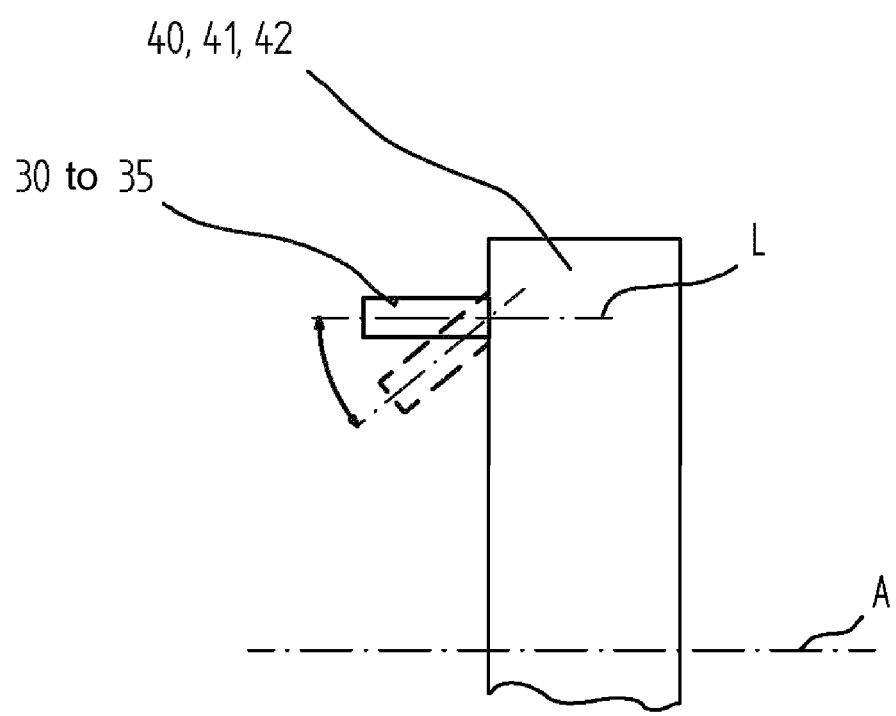
Figure 10:
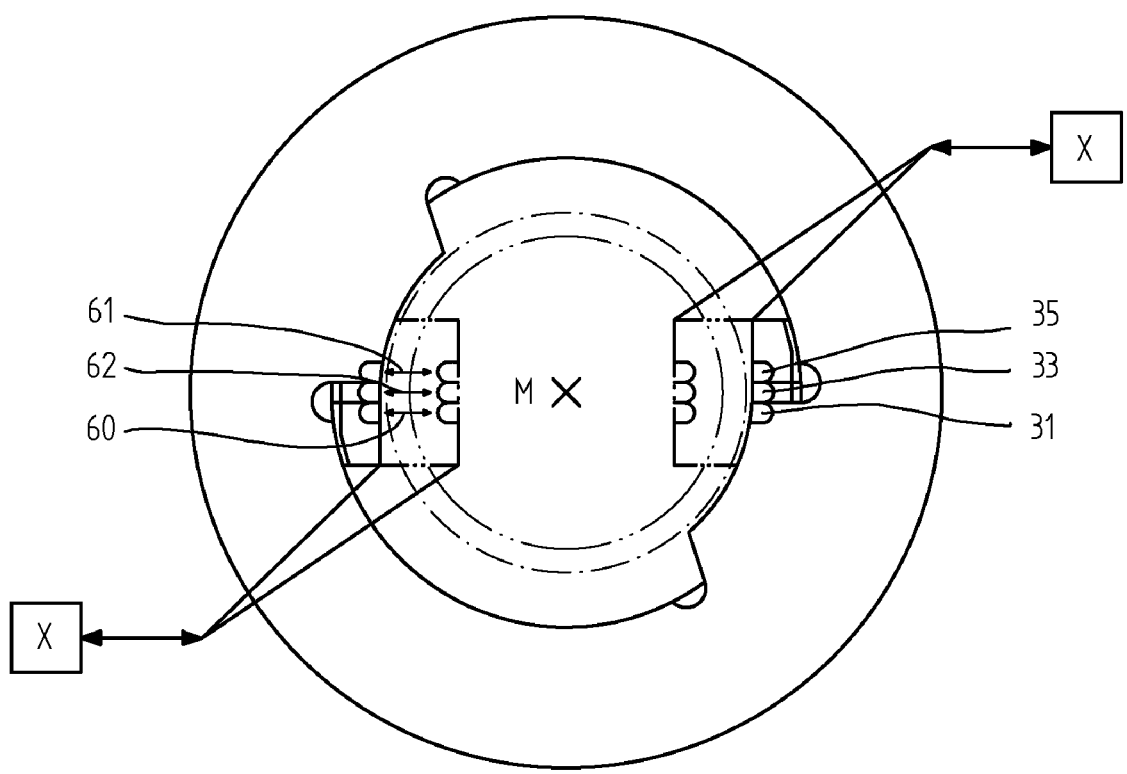
Figure 11:
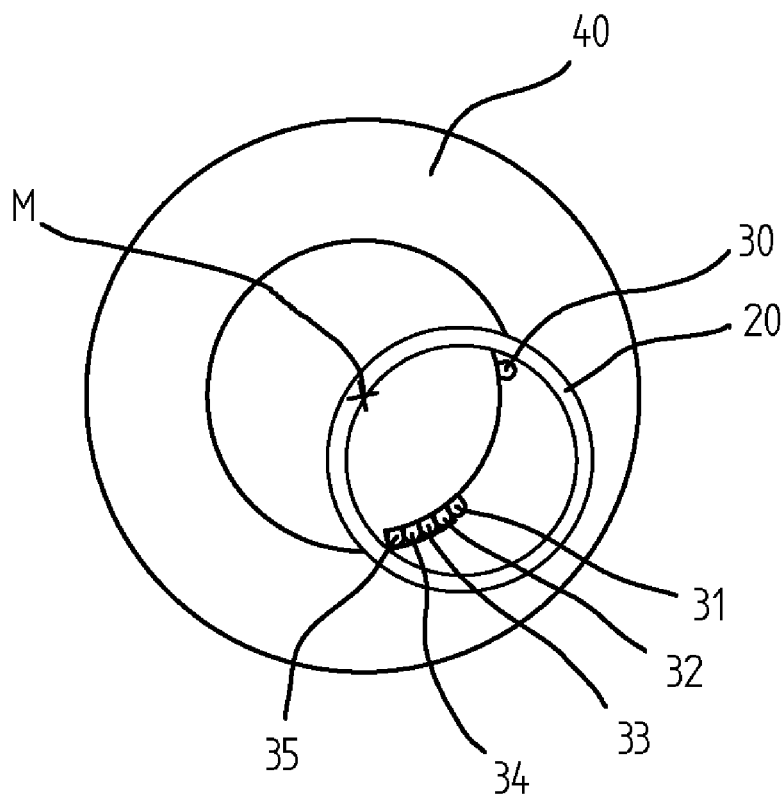
Figure 12:
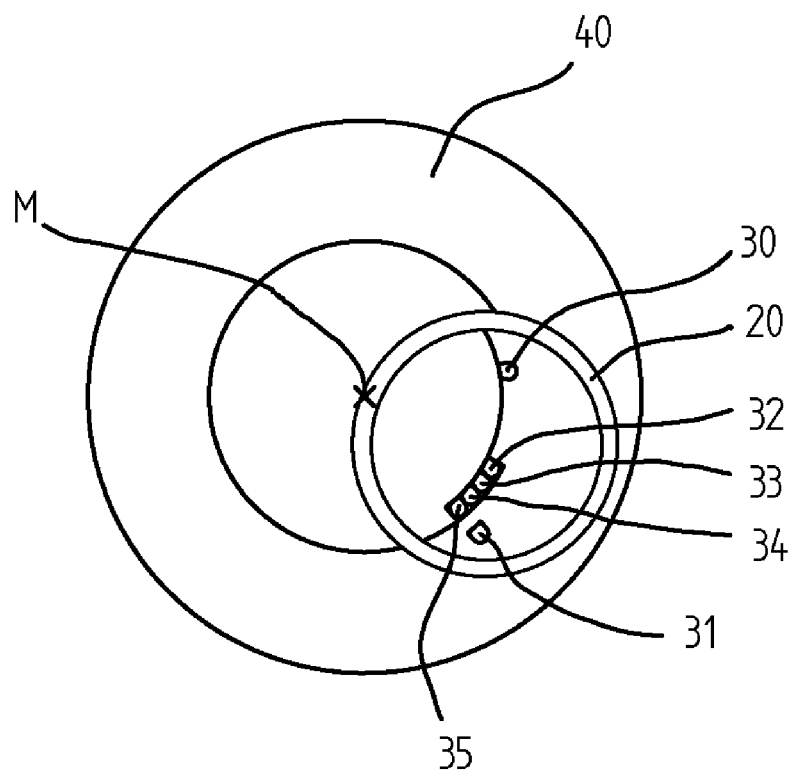
Figure 13:
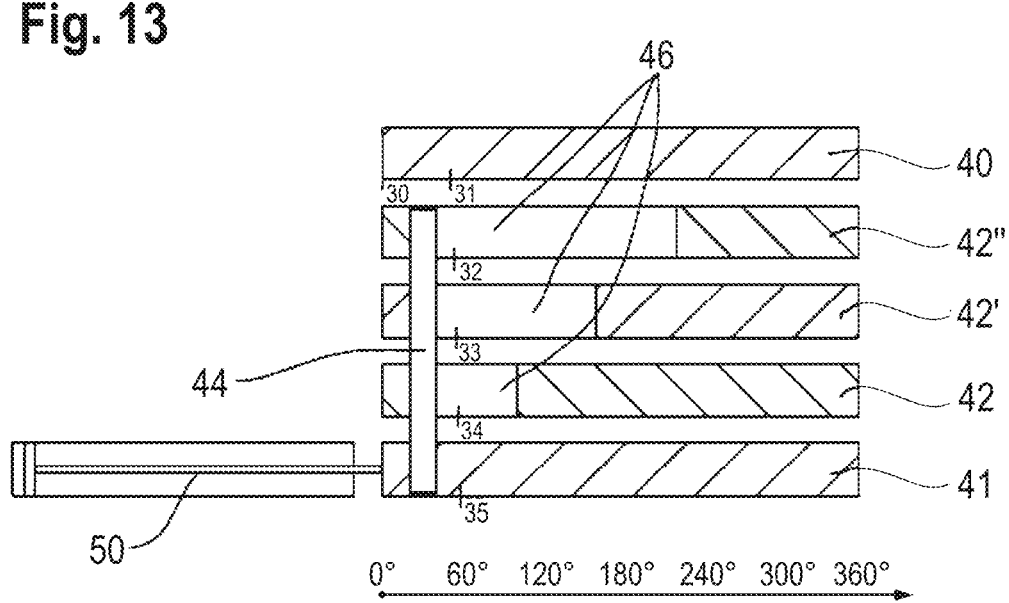
Figure 14:
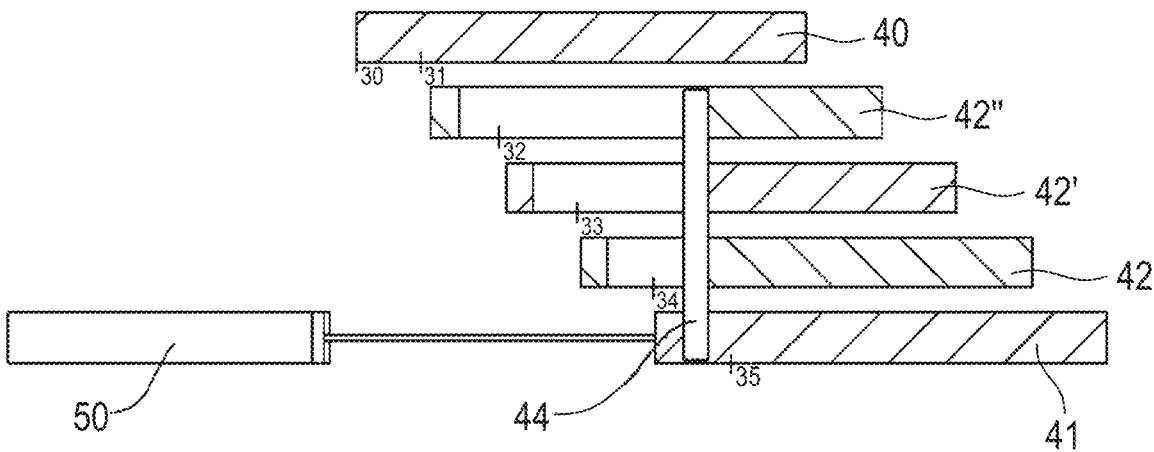
Figure 15:
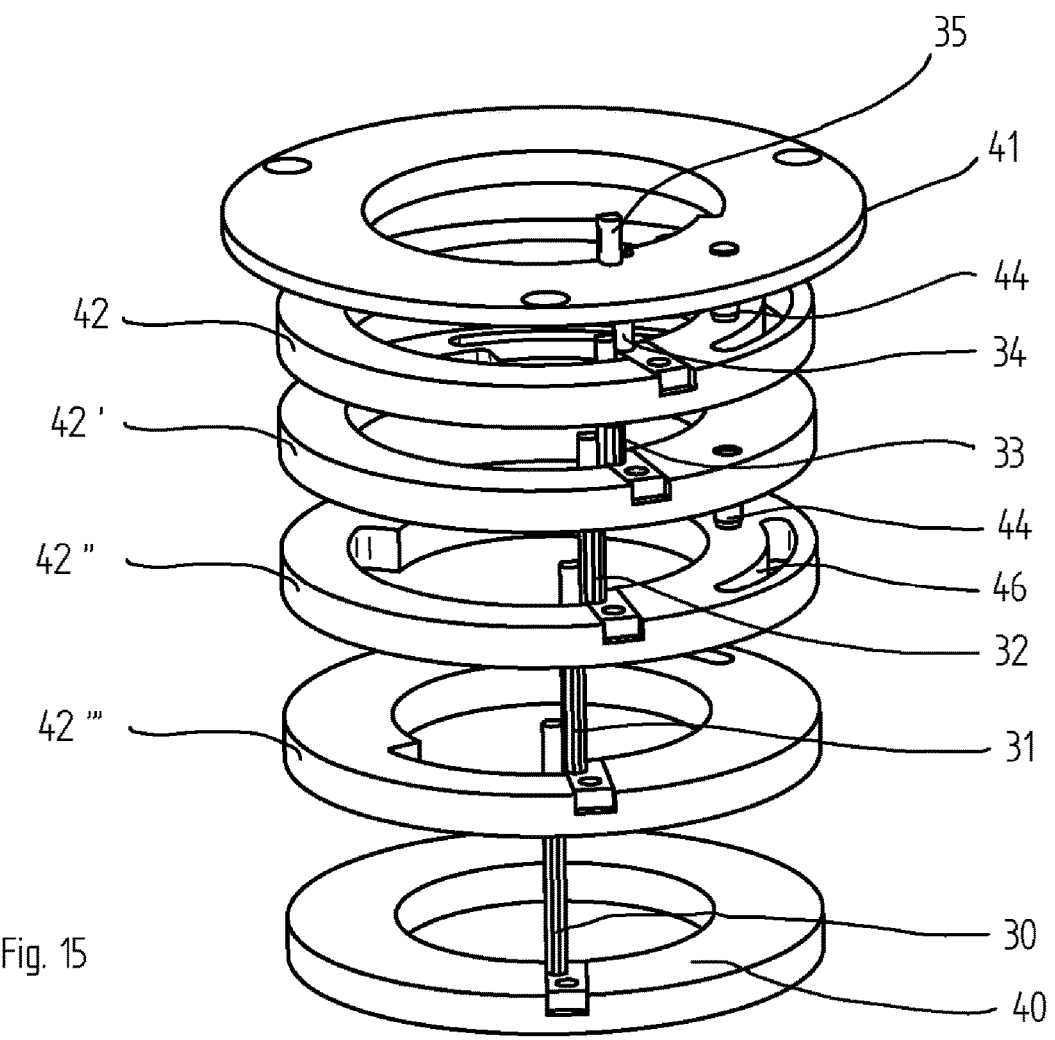
Figure 16:
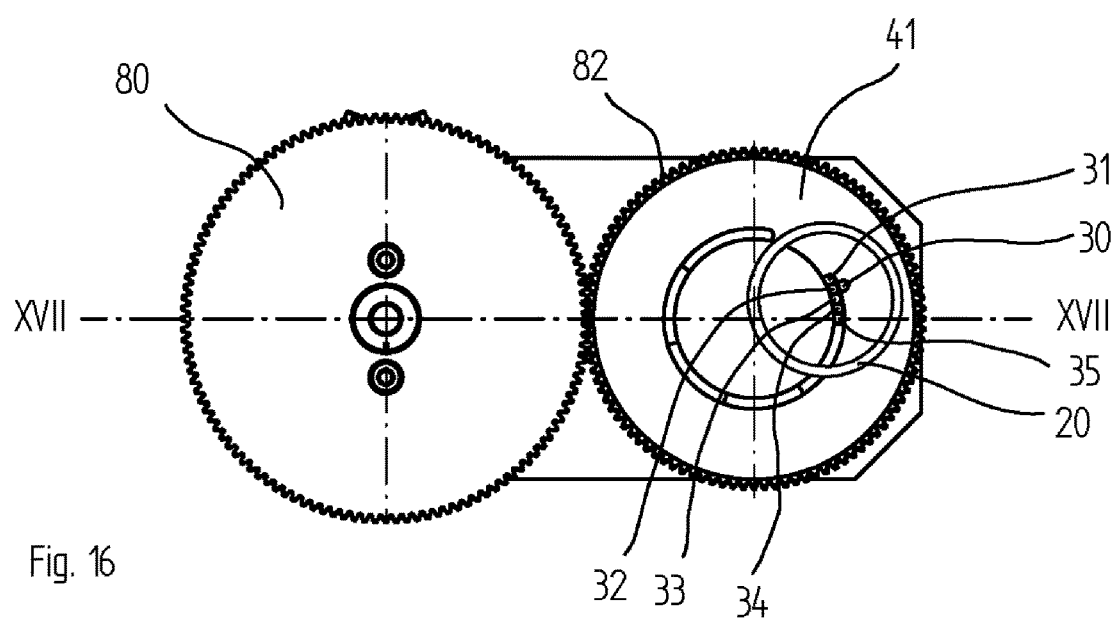
Figure 17:
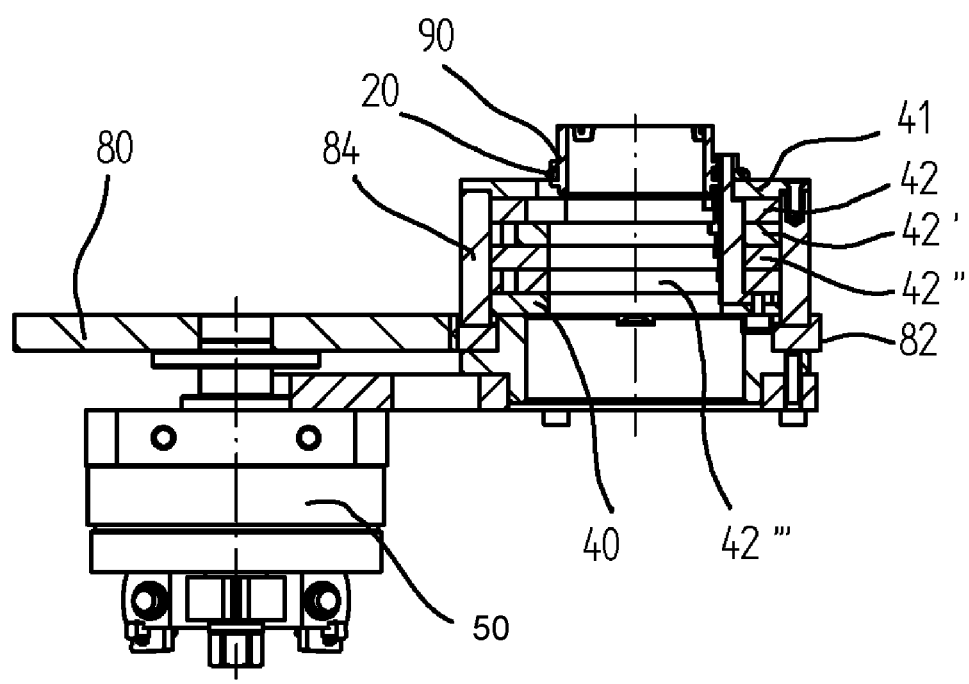

FIG. 9 shows a schematic drawing of a single finger carrier section in a side view representative of various finger carriers, in which the fingers are movably arranged on the finger carrier, according to a second variant, FIG. 10 shows a schematic top view of a mounting unit according to the invention, in which the fingers are movably arranged on the finger carrier, according to a third variant, FIG. 11 shows a schematic top view of a mounting unit according to a fourth variant, FIG. 12 shows a schematic top view of a mounting unit according to a fifth variant, FIG. 13 shows a schematic sectional view through the finger carriers of a mounting unit according to the invention in the basic position, FIG. 14 shows a sectional view through the finger carriers according to FIG. 13 in the clamping position, FIG. 15 shows a perspective exploded view of a mounting unit according to a sixth variant, FIG. 16 shows a top view of the mounting unit according to FIG. 15 along with the drive, and FIG. 17 shows a sectional view through the mounting unit along the line XVII-XVII in FIG. 16.

Figure 1:
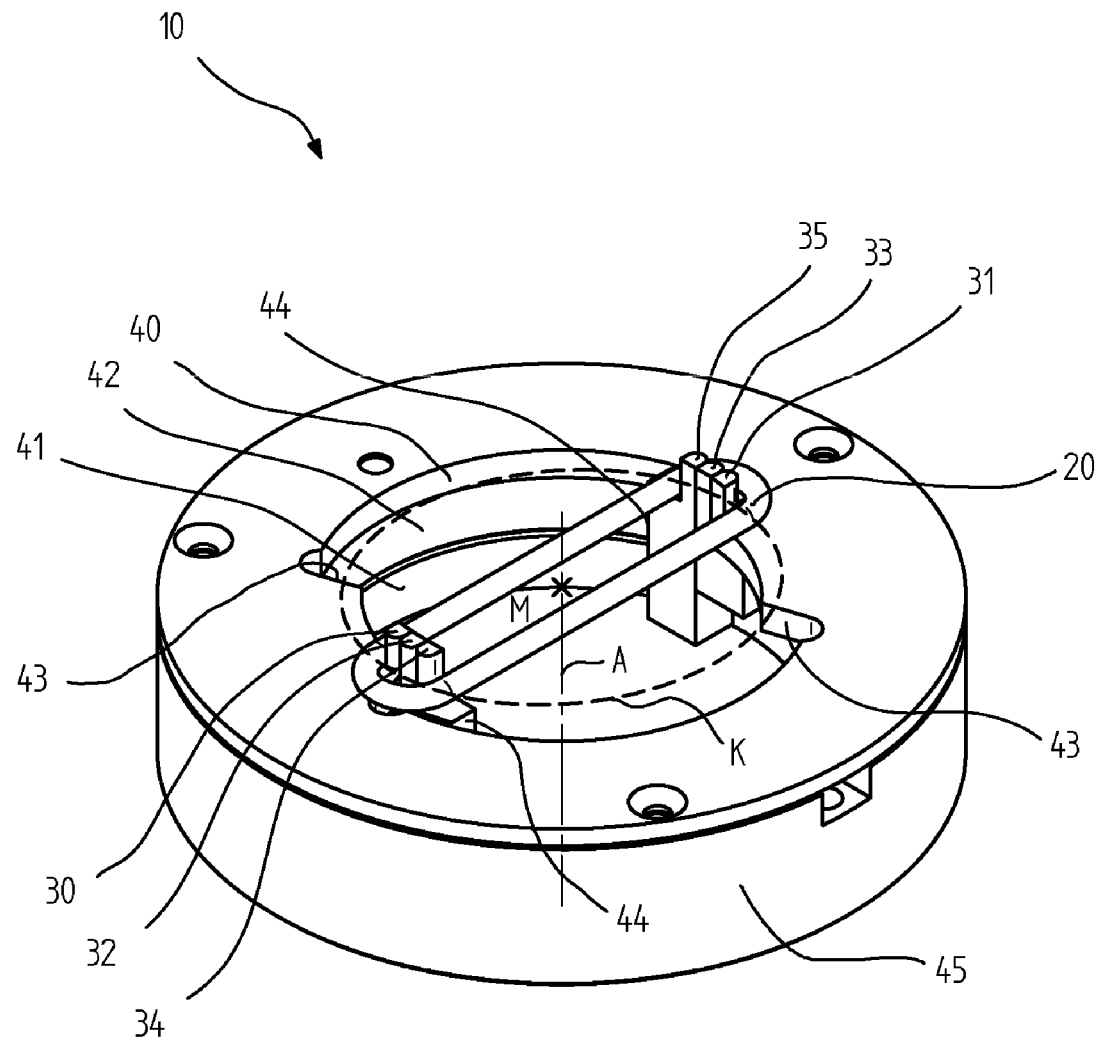
FIG. 1 shows a perspective view of a mounting unit in the basic position according to one embodiment of the invention.
Figure 2:
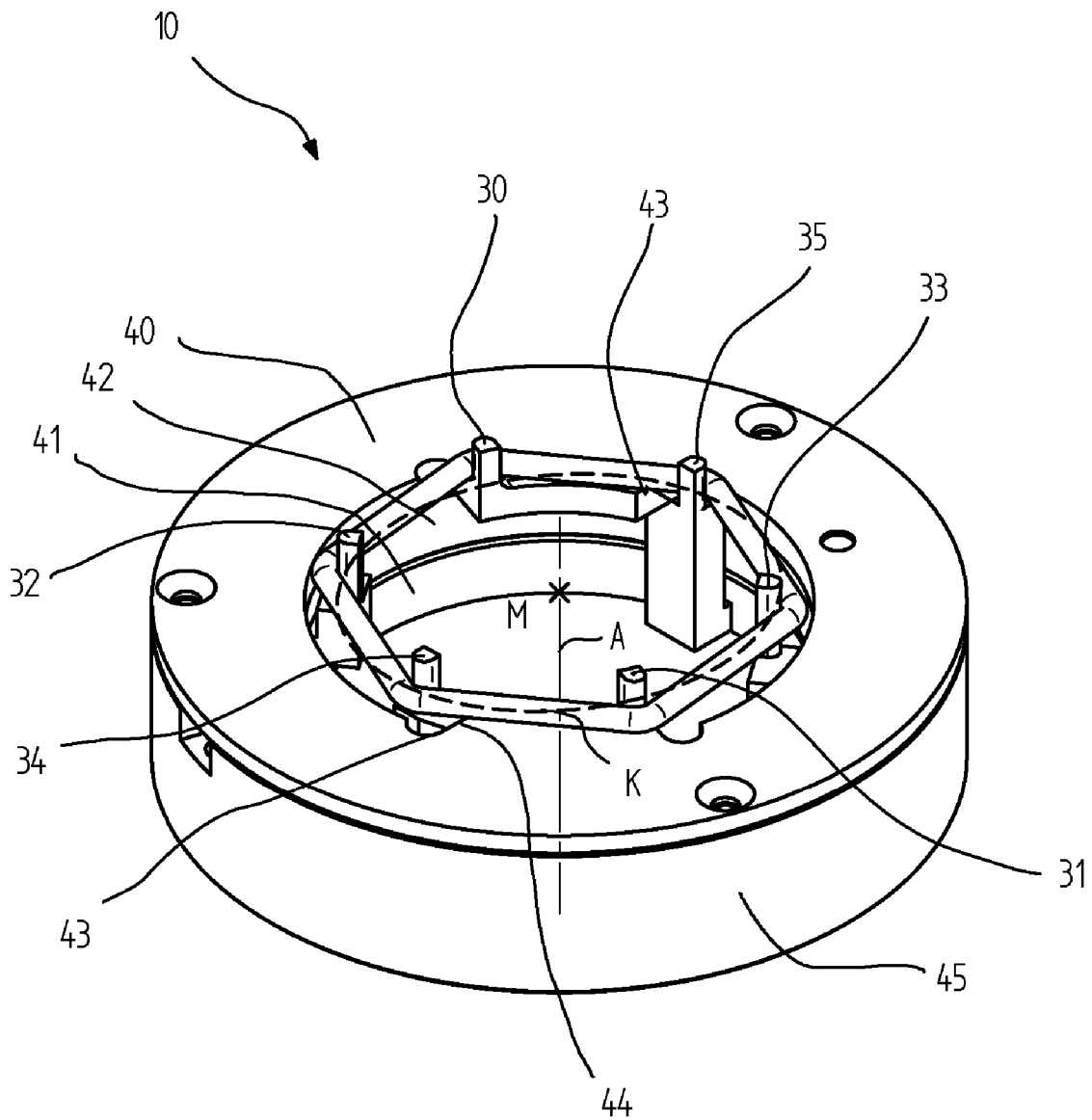
FIG. 2 shows a perspective view of the mounting unit in the clamping position.

FIG. 1 and FIG. 2 show an embodiment of the mounting unit 10 according to the invention with an elastic ring 20 to be mounted externally on a component. The mounting unit 10 is in the basic position in FIG. 1 and in the clamping position in FIG. 2.

The mounting unit 10 comprises, for example, six fingers 30, 31, 32, 33, 34 and 35 and three finger carriers 40, 41, 42, wherein two fingers, namely fingers 30, 31 and 32, 33 and 34, 35 in pairs, are respectively seated on an associated finger carrier 40, 41, 42.

The fingers 30 to 35 project into the cross-section defined by the ring 20 and framed by its circumferential cord, both in the basic position and in the clamping position of the mounting unit 10, so that the ring 20 is held by the fingers 30 to 35 on the exterior side thereof by the friction generated by the inherent tension of the ring 20, to prevent an unintentional slipping of the ring 20 from the fingers 30 to 35.

Various options are possible for accommodating the elastic ring 20 in the basic position.

According to one option, a manual positioning of the elastic ring 20 on the mounting unit 10 is carried out. For this purpose, the ring 20 is to be formed into an oval shape to facilitate the positioning on the two finger groups each consisting of the fingers 30 to 35.

As a further option, automatic positioning of the elastic ring 20 on the mounting unit 10 is conceivable. This could be done by an independent pick-up by the mounting unit 10, which would also be possible in combination with an automatic feed, which brings the elastic rings 20 into the correct shape and orientation for pick-up by the mounting unit.

Furthermore, simultaneous accommodation of a plurality of axially spaced elastic rings 20 is also conceivable, which could be done according to one of the previously described options. Subsequently, individual mounting of the elastic rings 20 at different positions could be performed.

According to one variant, the fingers 30 to 35 have rounded, e.g. polished edges at least at the contact points to the ring 20, to be able to ensure a gentle mounting process of the elastic ring 20 and to prevent damage to the ring 20. However, other geometries of the fingers 30 to 35 are also conceivable. For example, the contour of the fingers 30 to 35 may be adapted to the contour of the ring 20 and/or to special mounting requirements to produce a contact between the fingers 30 to 35 and the ring 20 which is as optimal as possible.

For example, the fingers 30 to 35, including the fingers of a finger pair/finger carrier, need not be of identical design. Rather, they can be adapted to the mounting requirements. For example, one or more of the fingers 30 to 35 may be seated radially further outward or project further outward than the remaining fingers (see FIG. 12 later), so that when the fingers 30 to 35 are pulled out of the mounted ring 20, only a few or only one finger is in contact with the ring 20.

In an axial view (top view), the fingers 30 to 35 may have a wide variety of shapes. This can go so far that the fingers can also have the shape of circular segments, comparable to an arc which is convex radially outwards. If the arcs are circumferentially very long, for example by extending over at least 60° at the circumference, the fingers, when rotated away from each other, can complement each other to form a circumferential wall in axial view (stepped in a crenellated manner due to the concentric positioning of the circular segments).

The longitudinal axes L of the fingers 30 to 35 may be parallel to each other and/or parallel to the axis of rotation A. Nevertheless, other orientations of the longitudinal axes are also conceivable.

The fingers 30 to 35 are coupled to each other such that a relative movement of the fingers 30 to 35 can take place along circular arcs, all these circular arcs defining the same circle K or concentric circles. That is, individual fingers may move about the same center M on a common circle or on separate circles or groups of separate circles which are concentric with each other.

Such a relative movement of the fingers 30 to 35 is realized by rotating at least one of the total of three ring-shaped finger carriers 40, 41, 42 about their common axis of rotation A, on which the fingers 30 to 35 are arranged.

In this embodiment, the fingers 30 to 35 are positioned in pairs on the associated finger carriers 40, 41, 42 and are offset by 180° with respect to the axis of rotation A of the ring-shaped finger carriers 40, 41, 42.

In the example embodiment shown, which is not to be understood as restrictive, the fingers 30 to 35 are arranged on the circumference of the inner enveloping surface of the respective finger carrier 40, 41, 42.

As the finger carriers 40, 41, 42 are arranged for example axially one above the other in the direction of the common axis of rotation A, the fingers 30 to 35 have, depending on the finger carrier 40, 41, 42 on which they are positioned, a length such that they all project to the same extent with their free end on the side of the mounting unit 10 facing the ring 20. In other words, the fingers 32 to 35 extend towards their free end past the respective finger carriers 40, 42 to the front of the finger carrier 40 which forms the end-side finger carrier. Thus, the fingers 30 to 35 may all have the same contact portion on which the ring can be accommodated.

If the mounting unit 10 is in the basic position, as shown in FIG. 1, the fingers 30 to 35 are arranged in two groups of three close to each other. In each of these two groups, one finger 30 to 35 of each finger carrier 40, 41, 42 is respectively represented. In the basic position, the elastic ring 20 has a shape deviating from a circular shape, resembling an oval-like loop.

To be able to adjust the mounting unit 10 from the basic position shown in FIG. 1 to the clamping position shown in FIG. 2, a relative movement of the fingers 30 to 35 and thus a rotation of at least one of the finger carriers 41, 42 is required. The fingers 30 to 35 increasingly adopt an arrangement in which they are more evenly spaced from each other until the clamping position is reached and the fingers 30 to 35 form the vertices of a preferably regular polygon. This also entails an increase in the cross-section framed by the ring 20.

To be able to carry out the adjustment from the basic position to the clamping position and back again and to bring the fingers 30 to 35 into the desired position, each finger carrier 40, 41, 42 has mechanical end stops 43 or drivers 44 acting in the circumferential direction on the adjacent finger carrier, which limit the relative movement of the finger carriers 40, 41, 42 with respect to each other and precisely define the arrangement of the fingers 30 to 35 in the clamping position. Thus, in the clamping position, all finger carriers 40, 41, 42 rest against the associated end stops 43 or drivers 44, as will be explained in more detail later.

If there is a relative movement of the finger carriers 40, 41, 42 back to the basic position, this movement is also defined by end stops 43 or drivers 44.

Figure 3:
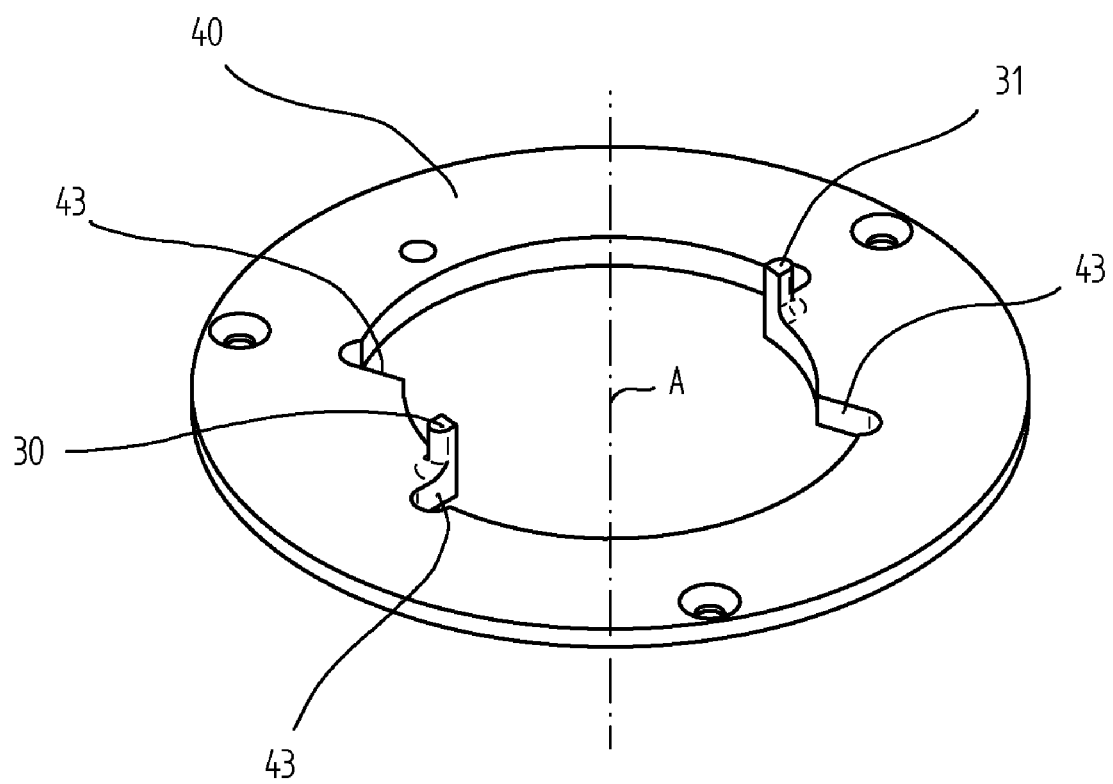
FIG. 3 shows a perspective view of a rotationally fixed finger carrier.
Figure 4:
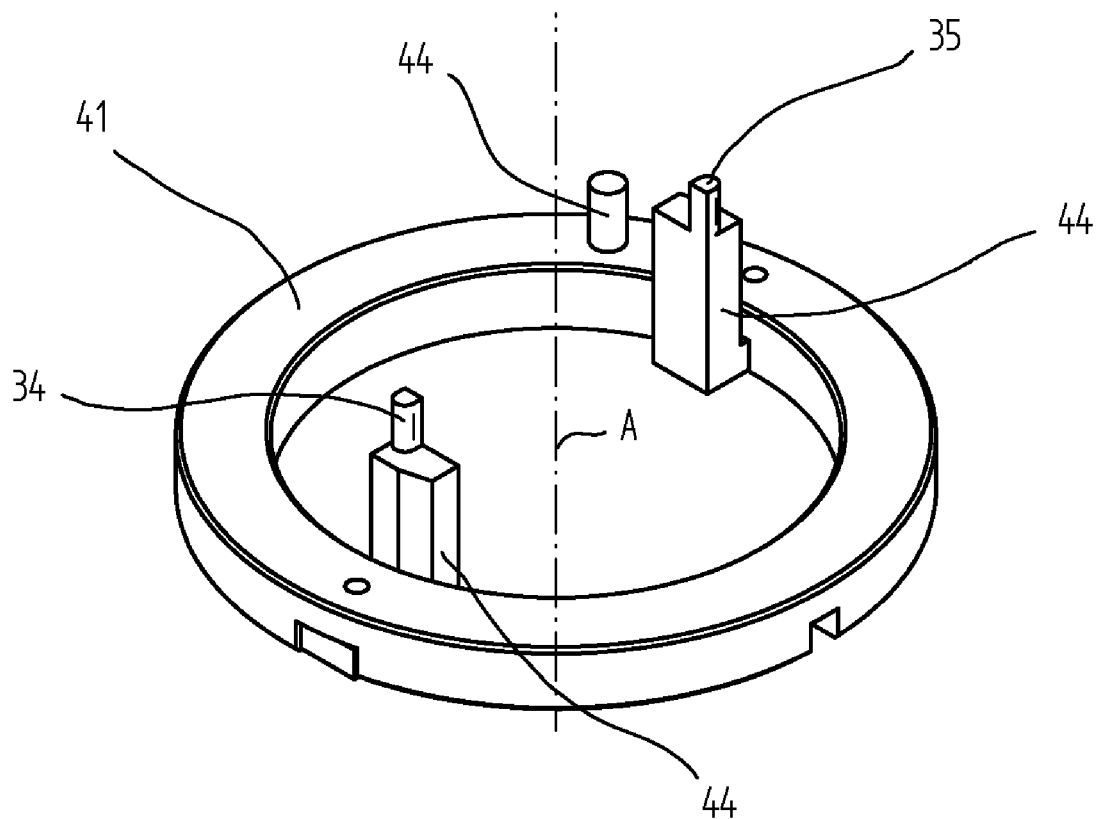
FIG. 4 shows a perspective view of a driven finger carrier.
Figure 5:
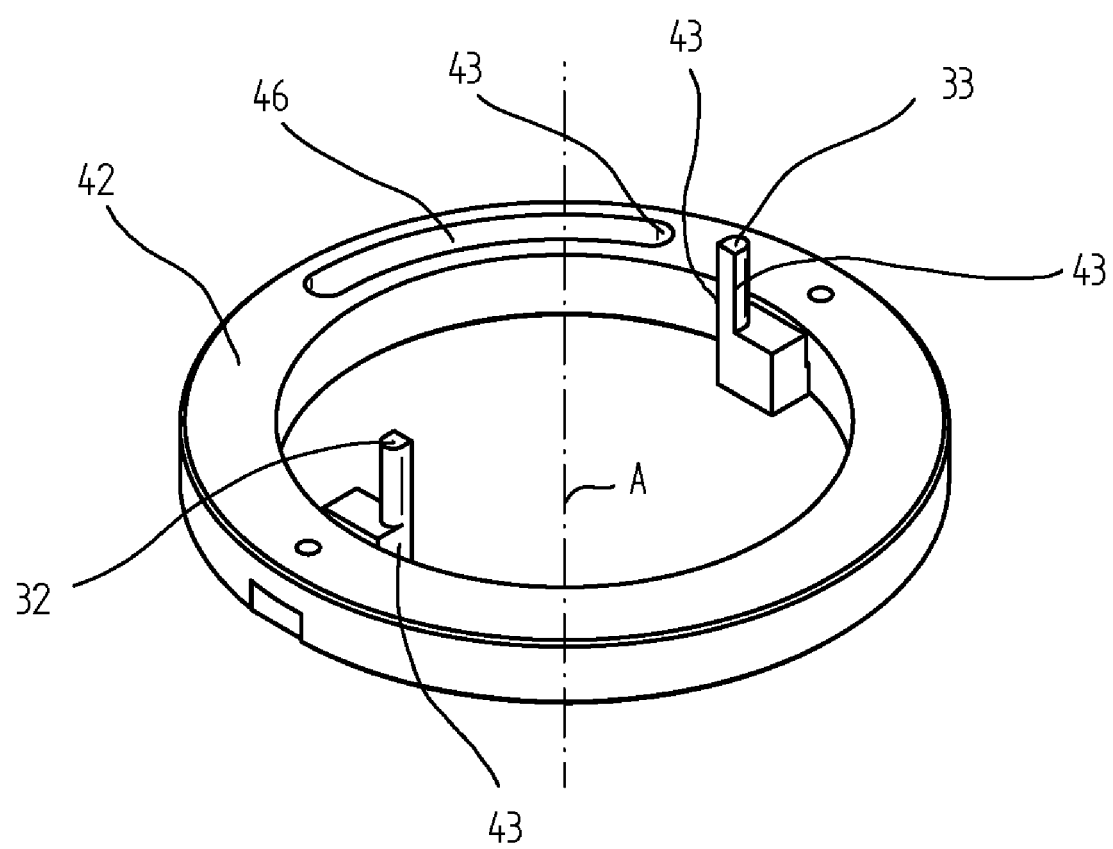
FIG. 5 shows a perspective view of a rotatable entrained finger carrier.

As explained in the previous paragraphs, all finger carriers 40, 41, 42 have a ring shape and each have two fingers 30, 31 and 32, 33 as well as 34, 35, which are offset by 180°, as well as end stops 43 and/or drivers 44 (see FIGS. 3 to 5). Nevertheless, finger carriers 40, 41, 42 differ to some extent depending on the function they perform in the mounting unit 10.

FIG. 3 shows a non-rotating and thus stationary finger carrier 40 on which the fingers 30, 31 are arranged. It would be conceivable to provide it additionally with a mechanical interface 45 at the end remote from the ring 20 or at the outer envelope surface of the finger carrier. According to FIGS. 1 and 2, this mechanical interface 45 can be designed as an outer housing into which the finger carriers 41 and 42 are inserted and with which the finger carrier 40 forms a non-destructively detachable connection. For example, the mechanical interface 45 could be used for connection to a multi-axis, freely programmable arm. This arm, along with the mounting unit, forms a ring mounting device.

FIGS. 4 and 5 show further finger carriers 41 and 42, respectively, which permit rotational movement about the axis of rotation A. In this example embodiment, only the lowest finger carrier 41 is driven and includes the fingers 34, 35. The second, middle, rotatable finger carrier 42 with the fingers 32, 33 is entrained by the driven finger carrier 41 and is a movable finger carrier in addition to the finger carrier 41.

The fingers 32 to 35 are axially longer than the fingers 30, 31 because the finger carriers 41, 42 thereof are located below the finger carrier 40. Further, the fingers 32 to 35 have a thickened, here cuboid, base which projects radially inwards from the remainder of the ring-shaped finger carrier 41, 42. Smaller, pin-like projections project upwardly from this base in cross-section (compared to the base) and are located at the axial level of the fingers 30, 31. These pin-like projections (fingers) then provide the contact surface to the ring.

For entraining the rotatable, i.e. moving finger carrier 42 from the basic position to the clamping position and back again, the driven finger carrier 41 is provided with at least one driver 44. According to one embodiment, the driver 44 is an axially projecting bolt on the finger carrier 41 which projects into an arcuate groove 46 in the rotatable finger carrier 42.

Generally, an elongated hole may be used instead of a groove, so that these terms are intended to be interchangeable—across this embodiment.

If the mounting unit 10 is to be returned to the basic position, the second rotatable finger carrier 42 is returned via further end stops 43 and drivers 44.

During the adjustment of the mounting unit 10, the previously described end stops 43 can serve both as an end stop and as a stop for driving the second rotatable finger carrier 42.

Figure 6:
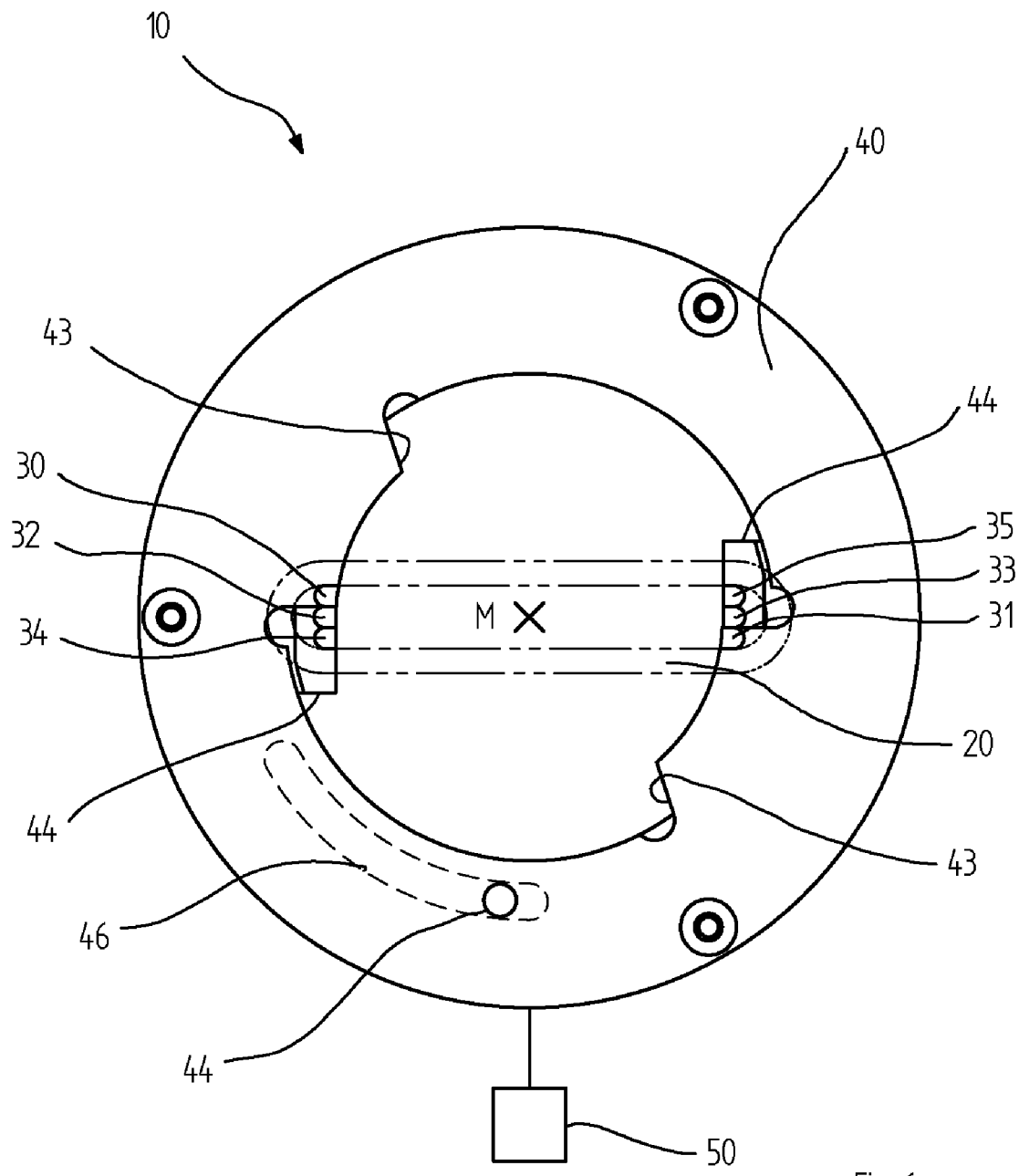
FIG. 6 shows a top view of the mounting unit of FIGS. 1 to 5 in the basic position.
Figure 7:
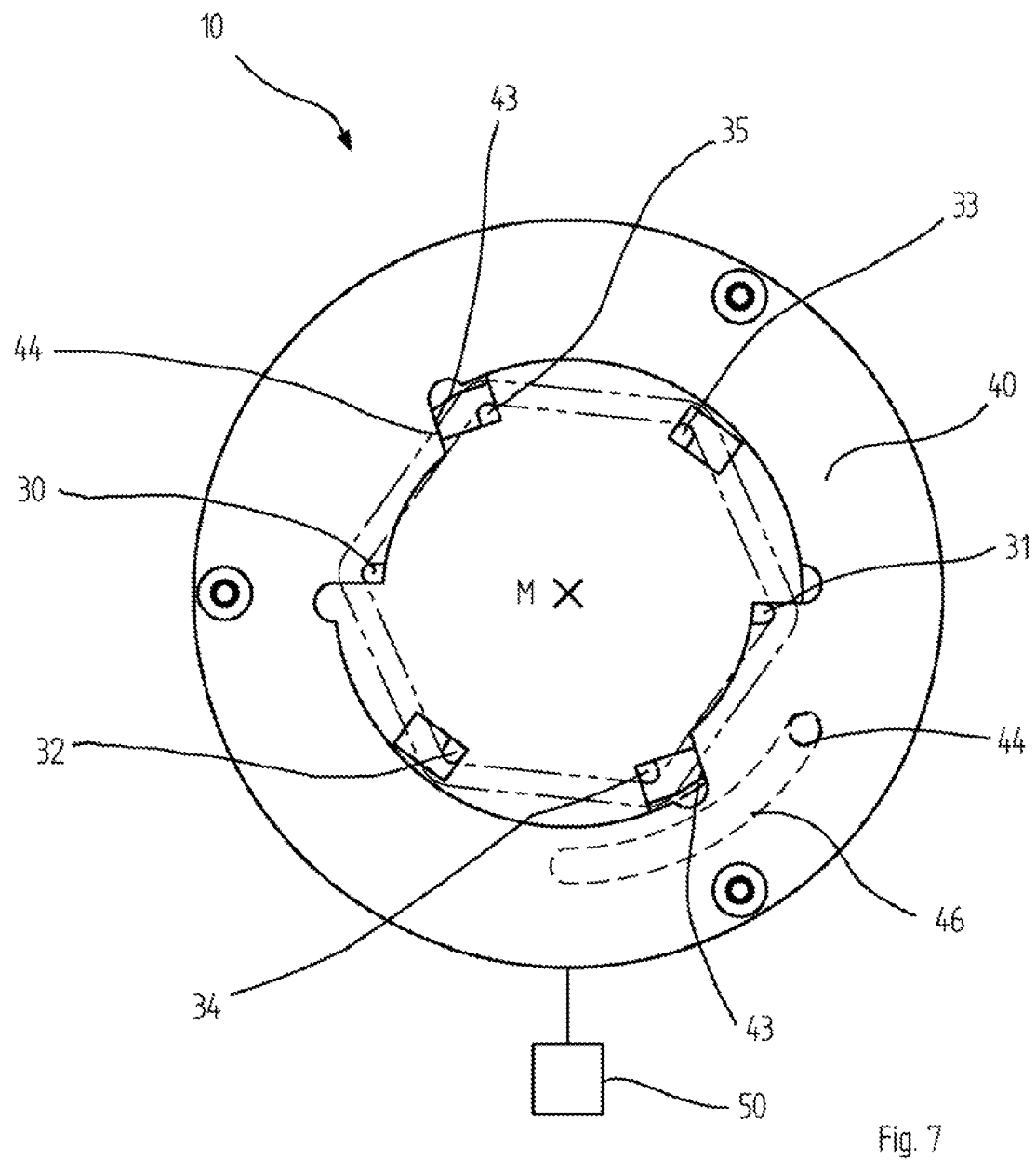
FIG. 7 shows a top view of the mounting unit of FIGS. 1 to 5 in the clamping position.

FIGS. 6 and 7 show a top view of the mounting unit 10 in the basic position and clamping position, respectively. To improve understanding of the mechanical structure, the driver 44, which may be in the form of a bolt, and the arcuate groove 46 are shown by dashed contours in these illustrations. They are actually located below the stationary finger carrier 40 and are thus not visible.

The driven finger carrier 41 is adjusted by the drive 50. If the mounting unit 10 is to be moved from the basic position to the clamping position, the driven finger carrier 41 is set into a counterclockwise rotational movement by the drive 50.

The driver 44 projecting into the circular-arc-shaped groove 46 of the finger carrier 42, i.e. the bolt which is arranged on the finger carrier 41, is located at the left end of the groove 46. When the driven finger carrier 41 is adjusted, the driver 44 initially moves unhindered in the circular-arc-shaped groove 46.

After the driven finger carrier 41 has undergone a rotational movement of about 60° relative to the (optionally axially adjacent) rotationally fixed finger carrier 40, the driver 44 abuts on the right end of the groove 46 with respect to FIG. 5, which serves here as the end stop 43. This causes the adjacent, second rotatable finger carrier 42 to be entrained. This is followed by a joint rotational movement of both finger carriers 41 and 42 by further 60°, so that the first driven finger carrier 41 has undergone a rotational movement of a total of 120° and the second rotatable finger carrier 42 has undergone a rotational movement of a total of 60° to the original starting position in the basic position. In the clamping position, the finger carrier 41 abuts against an end stop 43 on the finger carrier 40 by means of a driver 44, which in this case is formed, for example, on the base of the finger 35 (see FIG. 4).

The end stop 43 on the finger carrier 40 is formed by an inwardly oriented projection, see FIG. 7.

Although in the shown embodiment two end stops 43 are shown on the finger carrier 40, against which the base of the finger 34 and the base of the finger 35 respectively abut, one end stop 43 is also sufficient to avoid a double fit.

The mounting unit 10 is now in the clamping position. Here, the ring 20 has the shape of a regular polygon, in which the corners are defined by the fingers 30 to 35.

In the clamping position, the ring 20 is sufficiently stretched to insert the component into the cross-section framed by the ring 20 (i.e., the interior of the ring) and also deeper into the central opening of the finger carriers 40, 41, 42. Accordingly, the component dimensions in the area of the mounting position must be smaller than the cross-section circumscribed by the elastic ring 20 and the central opening of the finger carriers 40, 41, 42.

Subsequently, the mounting unit 10 is moved back in the direction of the basic position. For this purpose, the drive 50 moves the driven finger carrier 41 in the opposite direction to the original rotational movement and thus clockwise according to this embodiment. The cross-section circumscribed by the ring 20 is thus reduced and a sectional contact generated between the ring 20 and the component. The ring 20 may, for example, partially penetrate a groove in the component or adhere to the component by friction.

To ensure that the ring 20 actually engages in the desired groove, a slight rotation of the entire mounting unit 10 about the common axis of rotation A of the finger carriers 40, 41, 42 would also be conceivable at this point.

Subsequently, a relative movement between the component and the mounting unit 10 along the axis of rotation A of the finger carriers 40, 41, 42 and out of the ring cross-section causes the ring 20 to slide off the fingers 30 to 35 and the ring 20 to rest completely on the component and in the groove.

During the movement back to the basic position, the driven finger carrier 41 first performs a rotational movement of 60°. Then the driven finger carrier 41 contacts the second, rotatable finger carrier 42 in that a driver 44 (see FIG. 4) pointing in a clockwise direction on one or both fingers 34, 35 abuts against an end stop 43 on the adjacent finger 32, 33 (see FIG. 5). Thus, the finger carrier 41 also rotates the finger carrier 42 by 60° until the mounting unit 10 is again in the basic position.

Alternatively, in the embodiment according to FIGS. 1 to 5, the bolt-like driver 44 can abut against the opposite, left end of the groove 46 (according to FIG. 5) and entrain the finger carrier 42. In this case, the fingers 33 and 35 or 32 and 34 or the bases thereof do not abut against each other when they are rotated back.

According to a further embodiment, individual adjustment of the fingers 30 to 35 would also be conceivable, wherein in this embodiment only one finger 30 to 35 could be positioned on each finger carrier. The total of six finger carriers could then be positioned in grooves or rails, for example, and could also be moved by separate drives using different driving types.

To mount the elastic ring 20, a relative movement of the fingers 30 to 35 on the common circle K takes place as explained. Here, it may also happen that friction between the driven finger carrier 41 and the entrained finger carrier 42 or by the ring 20 causes both finger carriers 41 and 42 to move relative to the rotationally fixed finger carrier 40 from the start. Without friction, initially only the driven finger carrier 41 moves, which only in the further rotational movement rotates the entrained finger carrier 42 by the mechanical driver 44.

Figure 8:
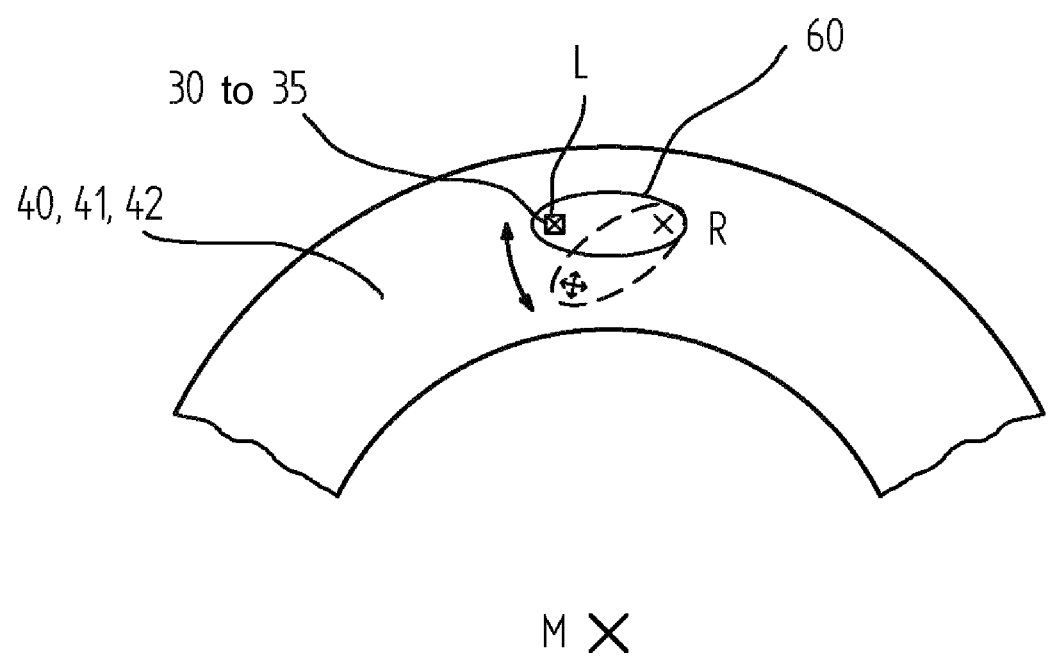
FIG. 8 shows a schematic drawing of a single finger carrier section in a top view representative of various finger carriers, in which the fingers are movably arranged on the finger carrier, according to a first variant.

FIGS. 8 and 9 show a first and a second variant for additional inward and outward movement of the fingers 30 to 35 to facilitate, among other things, accommodation of the ring 20 in the basic position.

According to the first variant shown in FIG. 8, it is possible to arrange the fingers 30 to 35 on an adjustment element 60 which is rotatably arranged on the finger carriers 40, 41, 42 and can adjust the fingers 30 to 35 inwardly and outwardly by a rotational movement about the axis of rotation R, while the longitudinal axes L of the fingers 30 to 35 are always parallel to each other and/or parallel to the axis of rotation R.

Furthermore, the second variant shown in FIG. 9 is conceivable, in which the free ends of the fingers 30 to 35 are moved inwards and outwards by a tilting movement, the angle between the longitudinal axes L of the fingers 30 to 35 and the axis of rotation A thus changing.

In the variant of FIG. 10, the fingers 30 to 35 are mounted inwardly on a linear track 61, 62, 63 (see double arrows in FIG. 10) so as to be displaceable on the finger carriers thereof via guides and can thus be adjusted inwardly and outwardly by the dimension X, e.g. when accommodating the ring. It is however also possible by this method to bring the fingers 30 to 35 to other diameters relative to the axis of rotation A, to adapt the mounting unit flexibly to rings of smaller or larger diameter, so that no new finger carriers have to be manufactured. This leads to a universal mounting unit. The adjustment can be made by means of cams or inclined surfaces on an adjustment ring not shown, or otherwise.

FIG. 11 shows a fourth variant of the mounting unit according to the invention in a schematic representation. Here the fingers 30 to 35 are no longer arranged in pairs opposite each other on a finger carrier. Rather, in this variant, for example, the fingers 30 and 31 are stationary and the fingers 32 to 35 are movable. The fingers 30 and 31 are attached to the same finger carrier 40 and are spaced apart from each other by less than 180°, preferably even by less than 90°.

The fingers 32 to 35 can be moved individually or in groups close to the finger 31, so that the fingers 31 to 35 form a group. To bring the fingers 31 to 35 together in this group as compactly as possible, the fingers 31 to 35 can preferably also touch each other.

Compared to the previous embodiments, it can be seen in FIG. 11 that all fingers 30 to 35 are generally very close to each other, so that rings 20 having a very small cross-section can be accommodated, more specifically without the rings 20 having to be deformed, i.e. brought into a different shape. This greatly simplifies and facilitates the entire handling process. The rings mounted here do not even have to touch the fingers 30 to 35 at this stage of mounting. This not only allows rings 20 of different cross-sections and/or cord thicknesses to be mounted in the same mounting unit, but also reduces the accuracy with which the rings 20 must be placed on or accommodated by the mounting unit. The alignment of the rings 20 is then always achieved later by rotating the fingers 30 to 35.

The fingers 30 to 35 lie, in relation to the center through which the axis of rotation also passes, in an angular range of at most 90°, the fingers 31 to 35 in an angular range smaller than 30°.

As already mentioned, the fingers 30 and 31 are stationary in the variant according to FIG. 11. To stretch the ring 20, either the fingers 32 to 35 are moved one after the other or in groups one after the other along the circle away from the finger 31. Alternatively, the finger 35 is first moved along the circle, then during the movement of the finger 35, the finger 34 is then moved at a distance from finger 35. Finally, the fingers 33 and 32 are then moved in timed sequence. Alternatively, groups within fingers 32 to 35 may be moved together in time.

In this case, and this is not to be understood as restrictive, the fingers 32 to 35 can then simultaneously reach their end position.

In the end position, the fingers 30 to 35 are then spaced far or maximally apart from each other, similar to those shown in FIG. 2, so that the ring 20 is maximally stretched.

In general, for the mounting unit, and not only for the one shown in FIG. 11, the fingers 30 to 35 can be moved not only in groups and using a drive, but if necessary also individually, i.e. with a separate drive, or in groups each with a separate drive. The movement of the fingers can thus be further individualized.

Whereas in the embodiment according to FIG. 11 the fingers 30 to 35 lie on a circumference of a circle, in the variant according to FIG. 12, the fingers 30 (stationary) and 32 to 35 (movable) are positioned on the same radius, whereas the stationary finger 31 is arranged radially outside but immediately adjacent to the fingers 32 to 35 of its group.

This makes it possible to minimize the maximum distance between the fingers 30, 35 furthest apart plus the finger thicknesses thereof, and to make the group of fingers 31 to 35 more compact in an axial view, so that overall the fingers 30 to 35 are closer together.

As can be seen from the comparison of FIGS. 11 and 12, there is thus even more distance between the outside fingers and the inner side of the ring 20. Thus, even smaller rings can be mounted here, or the rings 20 can be positioned with even more tolerance relative to the fingers 30 to 35 during feeding.

However, the mounting device may also be equipped with only three fingers. In the examples according to FIGS. 11 and 12, for example, three fingers are then omitted, and from the remaining three fingers, two may be arranged in a stationary manner so as to be spaced by 120° apart, and the third finger is then initially positioned within the angular range of the two stationary fingers or close thereto, to then be moved along a circle to a position in which all fingers are equally spaced so as to form an equilateral triangle. Alternatively, two of the three fingers are movable and initially form a group, and are then circumferentially (optimally evenly) spaced from each other along a circle or two concentric circles.

FIG. 13 shows a possible variant. Here, a separate moving finger carrier is provided for each moving finger. The fingers sitting on the finger carriers are shown symbolically only with their center line.

The stationary finger carrier 40, here for example the upper finger carrier, then carries the fingers 30 and 31, for example. Of course, it would also be possible to arrange only one finger on the stationary finger carrier 40.

The driven finger carrier 41 then carries the finger 32, the finger carrier 42 carries the finger 33, the finger carrier 42' carries the finger 34, and finally the finger carrier 42" carries the finger 35.

Here, the finger carrier 41 is the directly driven finger carrier.

As previously mentioned, the drive 50 may be of any design, i.e. an electric, pneumatic, hydraulic, etc. drive. A pneumatic drive is shown.

A driver 44, here in the form of a pin connected to the finger carrier 41, projects into grooves 46 of circumferentially varying length, more specifically elongated holes, in the finger carriers 42, 42' and 42".

When the drive 50 is activated, the finger carrier 41 is immediately rotated, and the driver 44, after a certain angle of rotation, then entrains the finger carrier 42, again after a certain further rotation, the finger carrier 42' and finally the finger carrier 42", to finally move them all into their end positions, as shown in FIG. 14. In this clamping position, the fingers 30 to 35 are then spaced apart, preferably evenly spaced apart on the circumference to clamp the ring 20.

Of course, in the drive variant according to FIGS. 13 and 14, more or fewer finger carriers with further fingers may be provided. In the variant shown in FIG. 13, the coupling of the finger carriers 41 to 42" is very simple and can thus be realized at low cost.

In addition, it is also generally possible, as already indicated previously, to provide more than one drive 50, so that not all finger carriers 41 to 42" are driven by the drive 50, but some of them are driven by a respective associated drive or individual ones by their own drives.

In a further design, all finger carriers 41 to 42" could of course also be moved at the beginning of the activation of the drive 50, with the first finger carrier then stopping after a certain amount of rotation until finally the last finger carrier has come into position. This applies in principle to all variants of the mounting unit.

It would also be possible, both by mechanical and electrical redesign, by moving the fingers 30 to 35 in a time-delayed manner, to form the ring 20, for example, first into a triangle formed by the fingers, and then to form this triangle into a hexagon by moving three fingers relative to the three remaining fingers not moved in this phase, and so on. Any number of variations can also be performed here.

While in the variants shown so far the finger carriers 41 to 42" are always moved in the same direction of rotation, they could also move partially in opposite directions to each other in another embodiment, which is possible either by means of an intermediate gear (in the case of only one drive) or by means of several drives. In this way, combinations of co-rotating and counter-rotating movements can be realized.

In the variant according to FIGS. 15 to 17, the fingers 30 to 35 are arranged in only one group in the contracted position, see FIG. 16.

This variant can of course also be realized with the drive according to FIGS. 13 to 14 and the previously described drive.

In the variant according to FIG. 15, this is not to be understood restrictively, each finger carrier 40 to 42" has to carry only one finger 30 to 35. This means that the finger carrier 40 (here the lowest finger carrier) is stationary. The corresponding finger 30 is then correspondingly longer and projects upward through the central openings in the finger carriers 41 to 42" to protrude with respect to the uppermost finger carrier 41, as does its finger 35.

The top finger carrier 41 is the driven finger carrier here. The finger carriers 42 to 42" are then driven thereby, and here again corresponding pins (drivers 44) and grooves 46 (with end stops) are engaged with each other.

As can be seen in FIG. 17, a drive 50 is provided here which drives a gear wheel 80 which in turn meshes with a mating gear wheel 82. A sleeve 84 is seated on the mating gear 82, which couples the mating gear 82 to the finger carrier 41 and simultaneously surrounds and, if necessary, supports the finger carriers 42 to 42".

FIG. 17 also shows a component 90 (also referred to herein as a body), in the groove of which a ring 20 is inserted at the outer circumference.

In general, the following additionally applies:

The number of fingers is not limited, odd numbers of fingers may also be provided.

As explained, a common driver 44 can be provided for all variants which moves the remaining driven finger carriers, or finger carriers are coupled to each other by their own drivers and end stops.

An active wiper for the ring 20 and/or a ring fixation on opposite circumferential ends of the group of fingers (in an axial view in the basic position), e.g. the group of fingers 30 to 35 in FIG. 16 may also be provided.

The invention claimed is:

1. A method of mounting at least one elastic ring on an exterior side of a body via a mounting unit having at least three fingers, at least one of which is movable relative to at least one other, the method comprising:
   a) positioning fingers and the at least one elastic ring relative to each other such that the fingers extend through a cross-section framed by the at least one elastic ring,
   b) moving at least one finger along a circle or moving a plurality of fingers along a circle or a plurality of concentric circles such that the at least one elastic ring is stretched and a cross-section thereof is increased,
   c) moving the at least one elastic ring and a component relative to each other so that the component projects into the cross-section and the at least one elastic ring extends around the component,
   d) moving at least one finger on the circle or a plurality of fingers on the common circle or concentric circles relative to each other so that the cross-section of the at least one elastic ring is reduced and the at least one elastic ring contacts the component in sections between adjacent fingers, and
   e) moving the fingers out of the cross-section, the at least one elastic ring sliding off the fingers and resting completely on the component.

2. The method according to claim 1, wherein the fingers are movable relative to each other individually or in groups about an axis of rotation passing through the center of the circle or circles.

3. The method according to claim 2, wherein the fingers are arranged individually or in groups on finger carriers and in that the relative movement of the fingers in step b) is caused by a rotation of at least one finger carrier to another about an axis of rotation.

4. The method according to claim 3, wherein the mounting unit comprises at least two finger carriers, wherein at least one finger carrier is fixed against rotation and the other finger carriers permit a rotational movement about the axis of rotation, so that the fingers in step b) are at least approximately evenly distributed at the circumference, or wherein all the finger carriers are rotatable.

5. The method according to claim 3, wherein the mounting unit comprises at least three finger carriers, wherein at least one finger carrier is fixed against rotation and the other finger carriers permit a rotational movement about the axis of rotation, so that the fingers in step b) are at least approximately evenly distributed at the circumference, or wherein all the finger carriers are rotatable.

6. The method according to claim 1, wherein the fingers are moved relative to each other so as to be moved in step b) from a basic position, in which the fingers are arranged close to each other in one or more groups, to a clamping position, in which the fingers are more evenly spaced apart.

7. The method according to claim 1, wherein the mounting unit has at least four fingers, two or more of which are movable relative to others, and in that in step b) at least two fingers are moved along a common circle or a plurality of concentric circles, and in step d) fingers on the circle or circles are moved towards each other.

* * * * *